United States Patent [19]

Lajovic

[11] Patent Number: 5,409,559
[45] Date of Patent: Apr. 25, 1995

[54] MAKING A LAMINATED TUBULAR BODY

[75] Inventor: Dusan S. Lajovic, Smithfield, Australia

[73] Assignee: Impact International Pty Ltd., Smithfield, Australia

[21] Appl. No.: 59,562

[22] Filed: May 12, 1993

[30] Foreign Application Priority Data

May 20, 1992 [AU] Australia .................. 17020/92

[51] Int. Cl.⁶ .................. B29C 47/02; B65D 5/40; B65D 5/74
[52] U.S. Cl. .................. 156/218; 156/244.12; 156/244.13; 156/244.14; 156/244.18; 156/252; 156/253; 156/466; 156/500; 156/513
[58] Field of Search .............. 156/218, 244.12, 244.13, 156/244.14, 244.18, 244.19, 252, 253, 466, 500, 513; 229/52 B, 117, 123.2, 125.15, 125.42, 162; 206/45.31; 220/82 R, 91, 94 R, 418, 465; 222/210, 527, 530, 465.1, 572

[56] References Cited

U.S. PATENT DOCUMENTS

| | | | |
|---|---|---|---|
| 2,608,501 | 8/1952 | Kimble | 154/82 |
| 2,872,760 | 2/1959 | Meissner | 53/20 |
| 2,958,364 | 11/1960 | Thompson | 156/201 |
| 3,221,943 | 12/1965 | Anderson | 222/183 |
| 3,376,180 | 4/1968 | Larson et al. | 156/244.17 |
| 3,376,181 | 4/1968 | Larson et al. | 156/203 |
| 3,395,623 | 8/1968 | Baker | 93/36.01 |
| 3,463,059 | 8/1969 | Vonk | 156/287 |
| 3,494,812 | 2/1970 | Cvacho | 156/287 |
| 3,503,823 | 3/1970 | Richart et al. | 156/244.17 |
| 4,572,422 | 2/1986 | Heuberger et al. | 229/7 R |
| 4,696,840 | 9/1987 | McCullough et al. | 220/462 |
| 4,724,027 | 2/1988 | Piltz et al. | 156/244.12 |
| 4,928,877 | 5/1990 | Lajovic | 229/125.42 |
| 5,034,080 | 7/1991 | Lajovic | 156/218 |

FOREIGN PATENT DOCUMENTS

| | | |
|---|---|---|
| 59040/60 | 10/1960 | Australia . |
| 49741/79 | 2/1980 | Australia . |
| 58881/80 | 12/1980 | Australia . |
| 84873/82 | 3/1983 | Australia . |
| 69952/87 | 9/1987 | Australia . |
| 0053715 | 6/1982 | European Pat. Off. . |
| 0134977 | 3/1985 | European Pat. Off. . |
| 0189750 | 8/1986 | European Pat. Off. . |
| 0162727 | 11/1986 | European Pat. Off. . |
| 0225677 | 6/1987 | European Pat. Off. . |
| 0231637 | 8/1987 | European Pat. Off. . |
| 0312203 | 4/1989 | European Pat. Off. . |
| 2434326 | 3/1980 | France . |
| 1178582 | 9/1964 | Germany . |
| 3336269 | 4/1985 | Germany . |
| 61-89028 | 5/1986 | Japan . |
| 1047338 | 11/1966 | United Kingdom . |

Primary Examiner—Caleb Weston
Attorney, Agent, or Firm—Nies, Kurz, Bergert & Tamburro; Philip E. Kurz

[57] ABSTRACT

A method and apparatus for continuously forming a laminated tubular body, disclosing the joining of opposite longitudinal edges of a strip of sheet material (5) to form a tubular body, extruding a hollow plastics lining member (1) within the body, expanding the hollow lining member within the tubular body to form a substantially continuous lining, pressure means (66, 67, 71, 72) for pressing the inner lining into sealing engagement with said inner surface, and cutting means (16) for cutting the continuously formed laminated tubular body into preselected lengths.

32 Claims, 14 Drawing Sheets

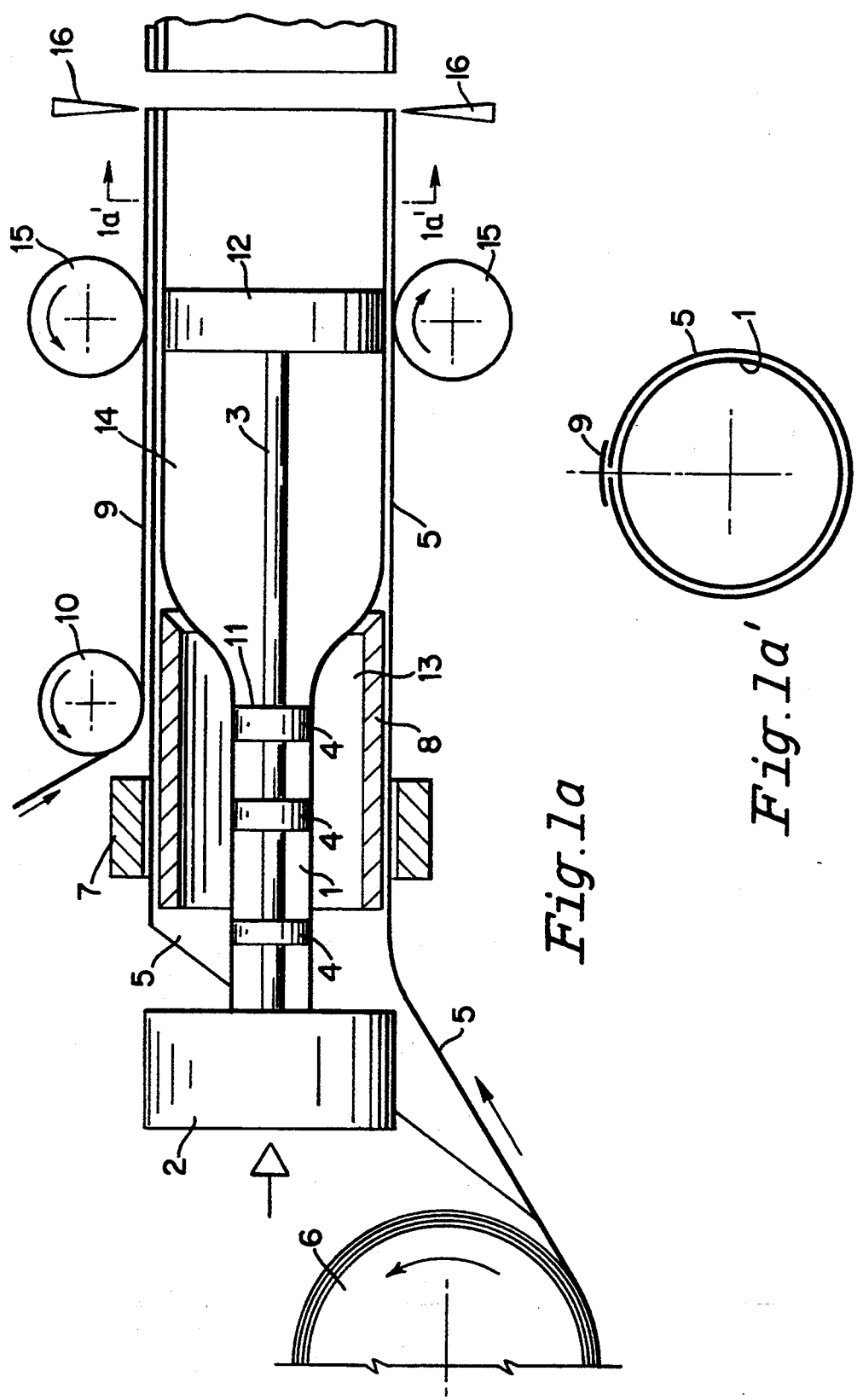

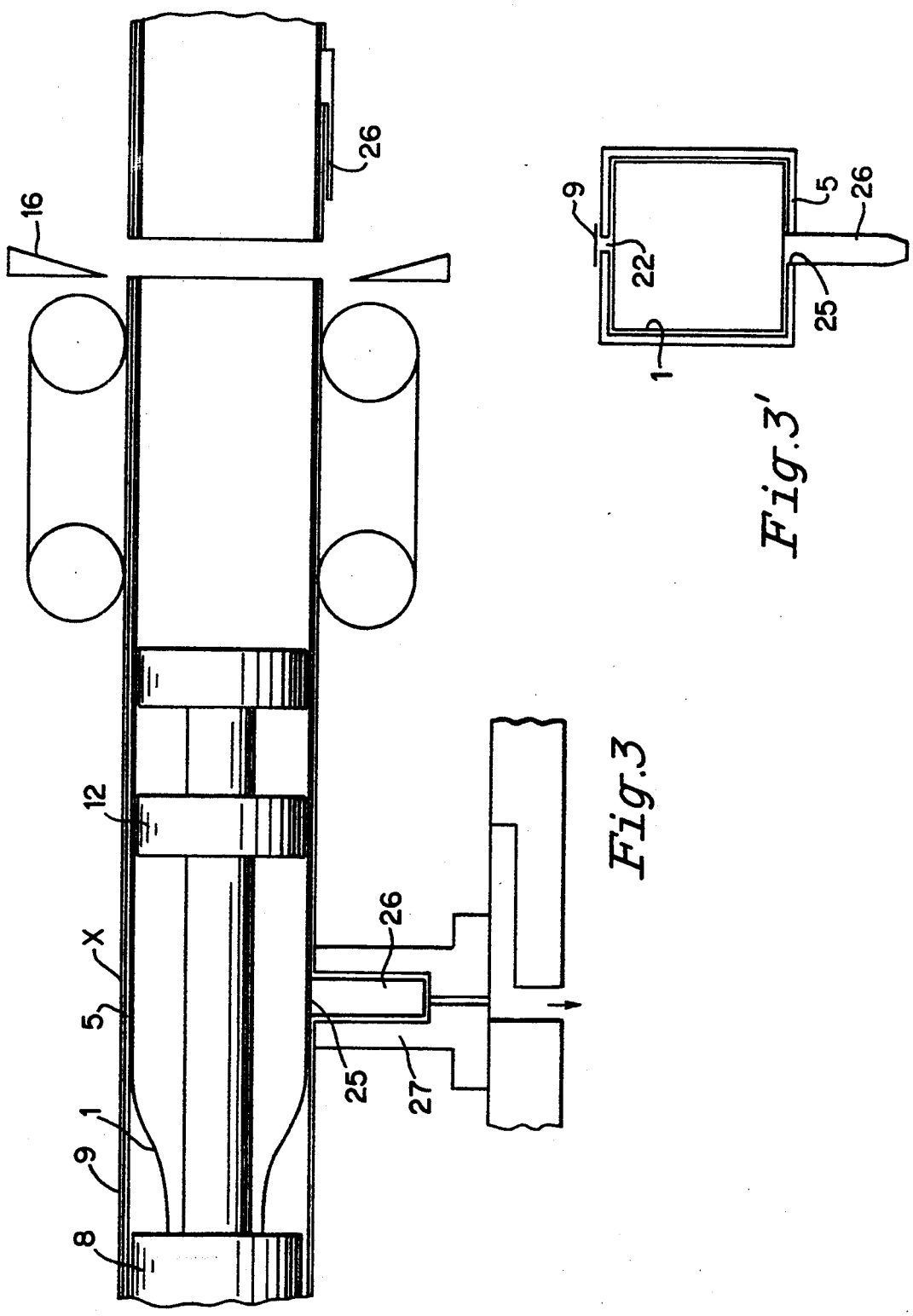

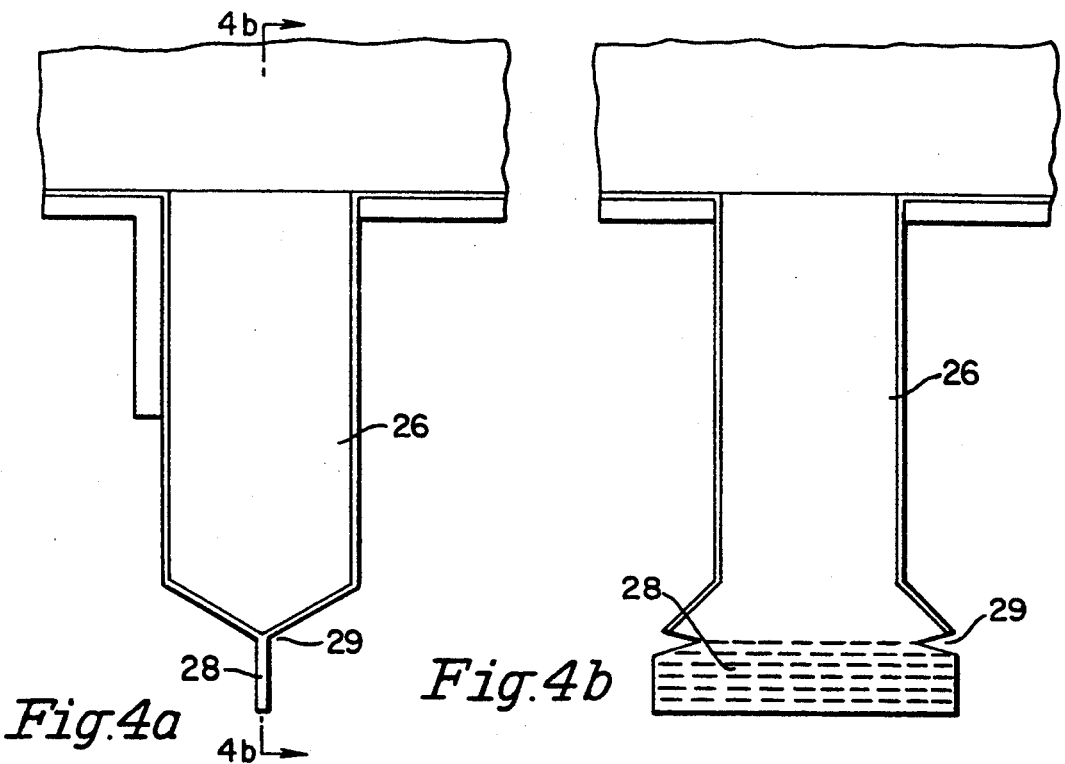
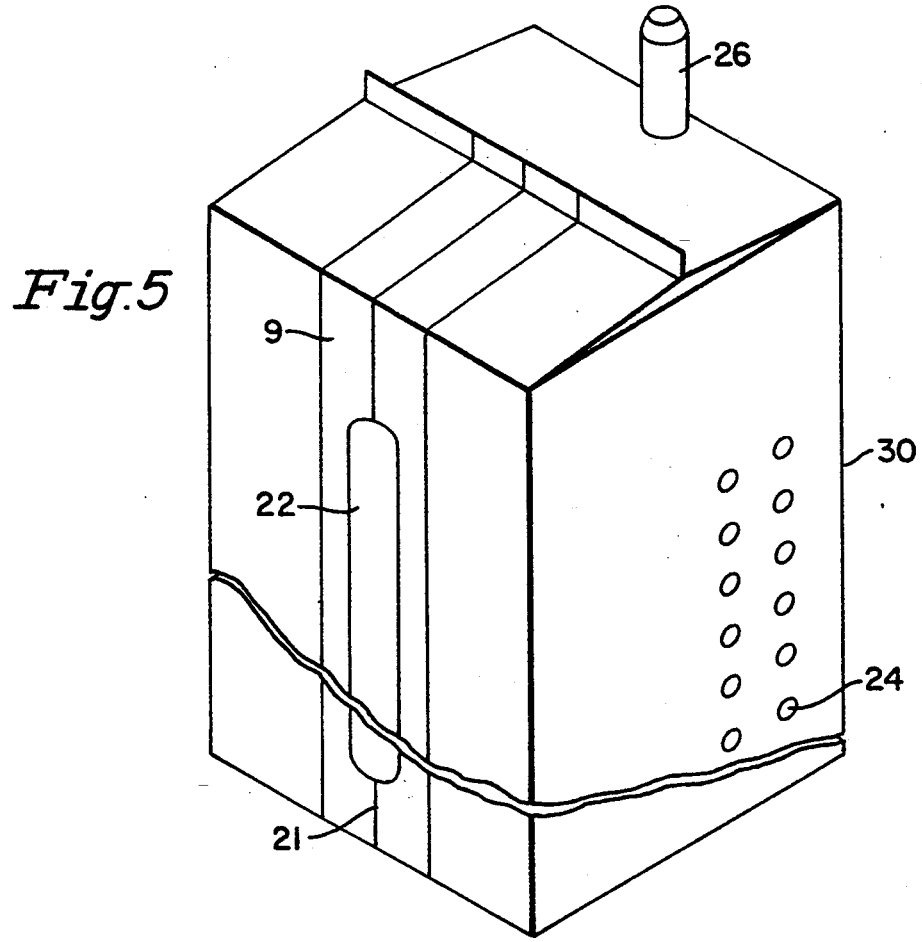

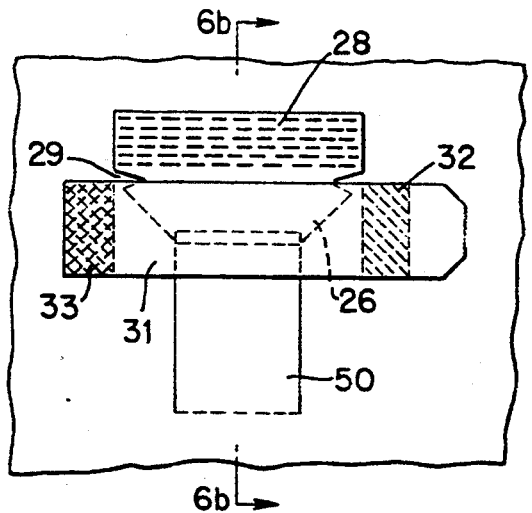
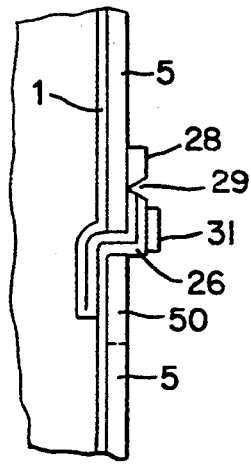
*Fig.6a*     *Fig.6b*
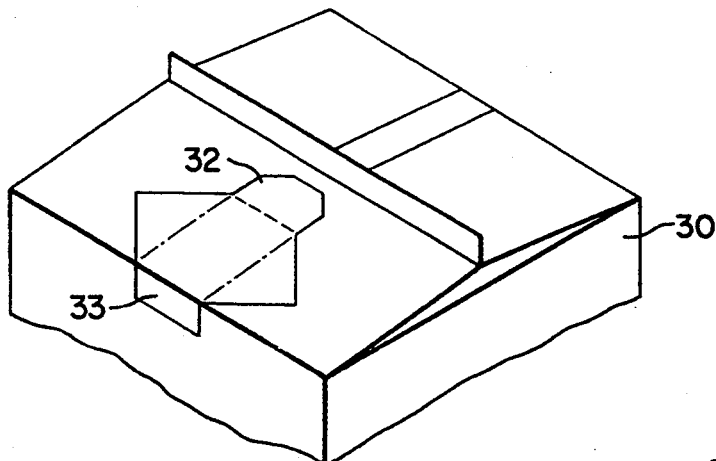
*Fig.6c*
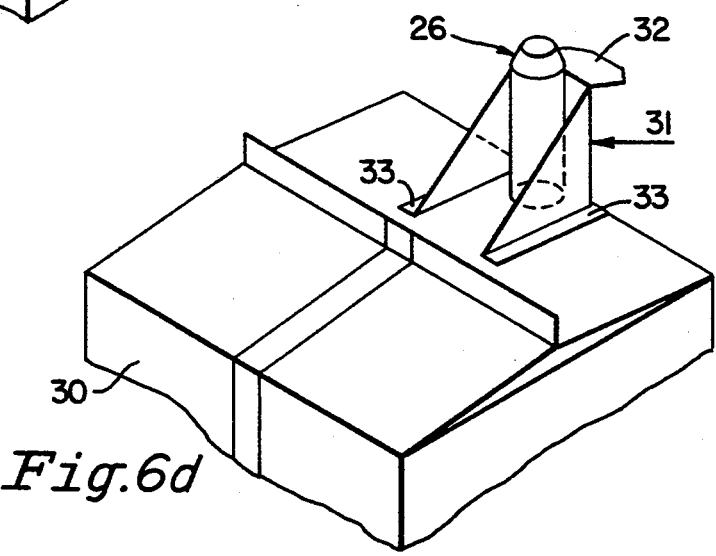
*Fig.6d*

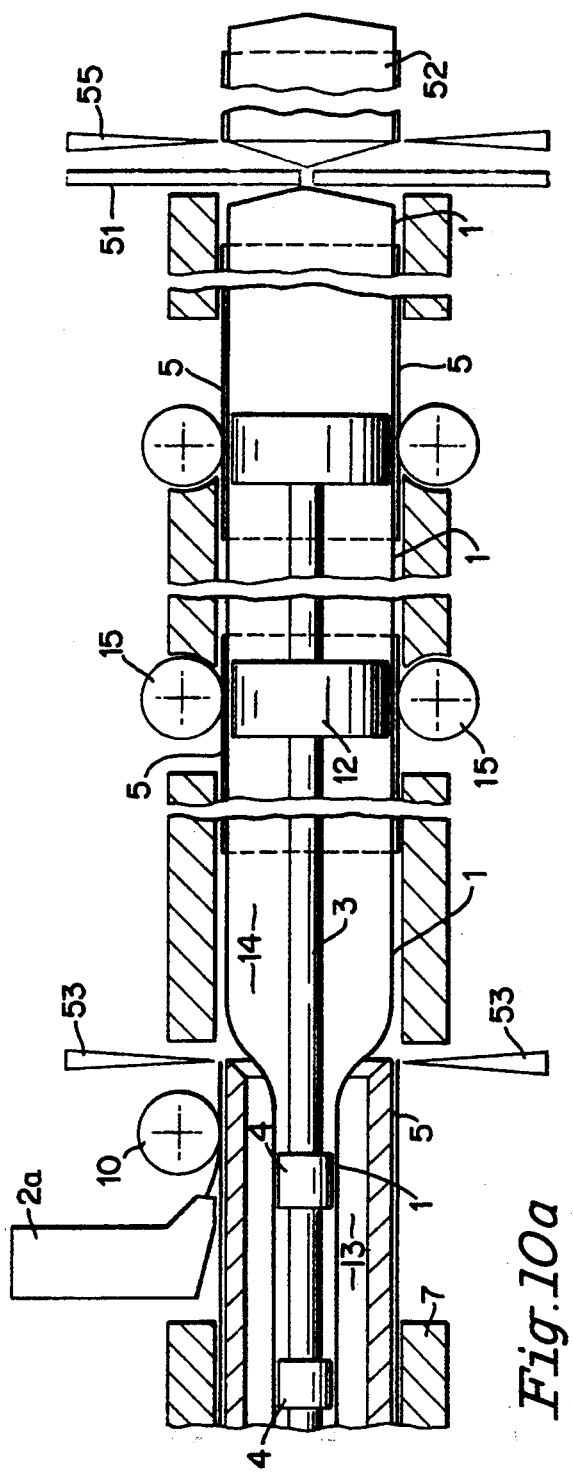
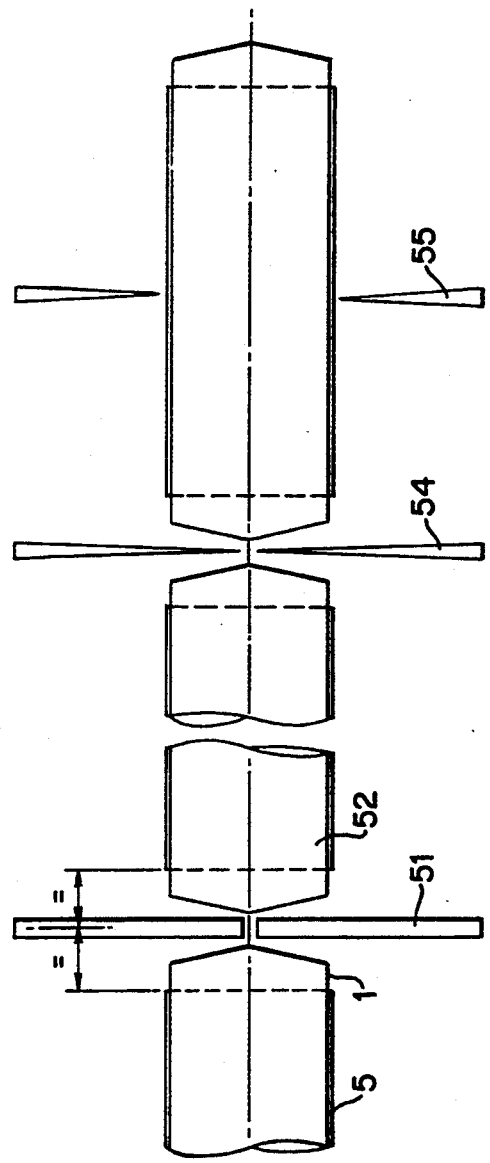
Fig.10a
Fig.10b

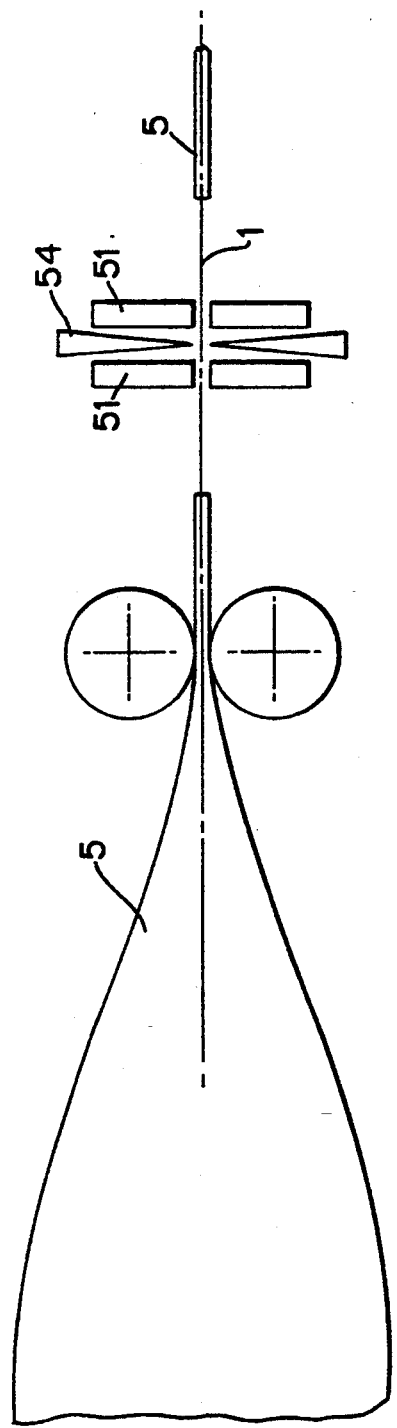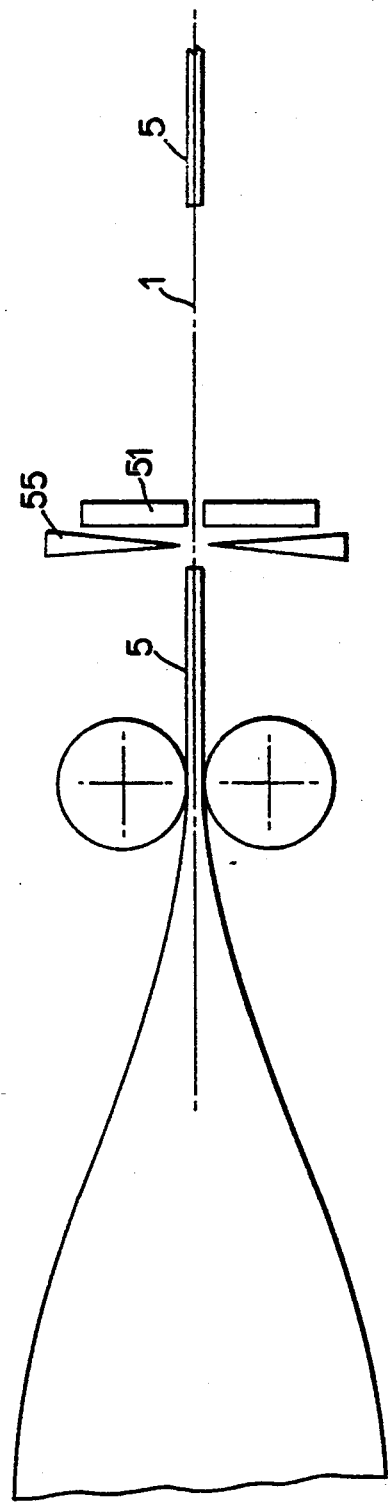

MAKING A LAMINATED TUBULAR BODY

This application is co-pending with my U.S. application Ser. No. 71,043, filed Jun. 2, 1993, which is a continuation of my U.S. application Ser. No. 698,262, filed May 10, 1991 (now abandoned). The invention herein is an improvement of the invention disclosed and described in my U.S. Pat. Nos. 4,928,877 and 5,034,081.

The invention concerns a laminated tubular body and a method of making such a body. More particularly, the invention relates to laminated tubular bodies having an extruded inner layer inflated to contact the inner surface of an outer layer.

The invention is therefore particularly applicable to lined containers. Such containers are shown, for example, in U.S. Pat. No. 4,696,840 which discloses a composite bag-in-box container formed by blow moulding a plastics inner bag inside a cardboard outer box to form the container.

Such containers and their forming process suffer from several disadvantages. Firstly, the process requires an injection nozzle to protrude into the container through what will ultimately become the pouring spout. The nozzle is withdrawn from the spout and the container is subsequently filled through the spout, which is finally sealed at the end of the process. This procedure is essentially a batch process and therefore relatively slow, inefficient, and does not lend itself to continuous high rate production. Further, it has been found generally that in the formation of composite laminated containers, it is difficult to consistently obtain adequate adhesion between the lining and the outer layer in a fast and cost effective manner. Consequently, the lining often breaks away from the outer container.

It is therefore an object of the present invention to provide an improved method and apparatus which overcomes or substantially ameliorates at least some of the deficiencies of the prior art.

Accordingly, in a first aspect, the invention provides a method of continuously forming laminated tubular bodies, said method including the steps of drawing opposite longitudinal edges of a strip of flexible at least partially resilient sheet material into close proximity, joining said longitudinal edges to form a tubular body having an inner surface and an outer surface, extruding a hollow plastics lining member within said tubular body, expanding the hollow lining member within the tubular body to form a substantially continuous lining, applying pressure to bring the inner lining into bonding engagement with the inner surface thereby continuously to form a laminated tube, and cutting the tube into bodies of preselected lengths.

Preferably, internal and external pressure are applied simultaneously. At least the external pressure is preferably applied by external pressure roller means including at least one set of rollers circumferentially spaced around the outer periphery of the tubular body. In an alternative embodiment, however, the external pressure roller means includes a series of circumferentially spaced friction pads.

The internal pressure may simply be provided by the fluid medium used to inflate the lining member within the tubular body, but is preferably provided at least partially by internal pressure roller means comprising a set of rollers spaced circumferentially around the inner periphery of the body.

Preferably also, the method includes the further step of forming at least one aperture in the tubular body prior to expanding said lining, such that the lining extends unjoined and unbroken through the aperture to form a sealed protuberance projecting outwardly beyond the outer surface of the tubular body. In one embodiment, the inner layer extends through one of the apertures to form a spout defining a channel in fluid communication with the interior of the body. Additionally, the body may comprise an array of the sealed protuberances to form a textured gripping surface.

According to a second aspect, the invention provides an apparatus for continuously forming a laminated tubular body, said apparatus including means for drawing opposite longitudinal edges of a strip of sheet material into close proximity, means for joining said longitudinal edges to form a tubular body having an inner surface and an outer surface, a die for extruding a hollow plastics lining member within said tubular body, means for expanding the hollow lining member within the tubular body to form a substantially continuous lining, pressure means for pressing the inner lining into bonding engagement with said inner surface, and cutting means for cutting the continuously formed laminated tubular body into preselected lengths.

Preferably, the apparatus includes complementary internal and external pressure means adapted simultaneously to apply internal and external pressure and thereby press the lining into bonding engagement with the inner surface of the outer tubular body.

Preferably also, the external pressure means includes a series of pressure rollers circumferentially spaced around the outside of the tubular body. Alternatively, however, the external pressure means may include a series of circumferentially spaced friction pads. The pressure rollers or friction pads may be fixed, adjustable, or free floating.

In the preferred embodiment, the internal pressure means includes a series of internal pressure rollers biased outwardly toward the lining member. In this way, the internal pressure rollers and external rollers or friction pads together sandwich the side wall of the composite tube and thereby urge the inner lining member into bonding engagement with the outer tubular body.

Preferably also, the apparatus includes means for forming at least one aperture in the tubular body prior to expanding the lining, such that upon inflation the lining extends unjoined and unbroken through the aperture to form a sealed protuberance projecting outwardly beyond the outer surface of the tubular body.

According to a third aspect, the invention provides a laminated tubular body formed in accordance with the method as defined above, said body including an outer layer having an inner surface and an outer surface and a substantially continuous inner layer in sealing engagement with said outer layer to define a lining substantially covering said inner surface.

Preferably, an array of sealed protuberances are formed to provide a textured gripping surface. Preferably also, the hollow lining member is expanded so as to extend through one of the apertures to form a pouring spout defining a channel in fluid communication with the interior of the laminated tubular body. The formation of a spout in this way is particularly advantageous in so far as it obviates the need for a separate spout forming process step.

Preferably, a filling passage is provided through the centre of the extrusion die to enable the container to be filled as soon as it is formed. The container may be sealed immediately after filling, thereby preventing subsequent contamination of the contents during handling.

The strip of material may have straight longitudinally edges or serrated edges and it may be formed into a tubular body in order to form, in the finished product, a substantially straight longitudinally seam or a spiral one. The material itself, which may comprise several layers, may be plastics, cardboard, metal or any other suitable material. The hollow lining member may have barrier, adhesive, sealing, welding or other properties as desired. The finished laminated tubular bodies may be further processed to make containers, for instance laminated paper or metal foil containers for milk, laminated plastics containers for salt, or laminated metal containers for fruit.

It should be appreciated that the invention also includes within its scope a method substantially as described above wherein said hollow lining member is extruded continuously from the die, wherein the respective opposite longitudinal edges of a plurality of said strips are draw into close proximite, wherein said respective opposite longitudinal edges are joined to form a plurality of tubular bodies, wherein said tubular bodies are arranged in spaced apart relationship around the hollow lining member, and wherein said lining member is expanded to form a substantially continuous lining in intimate contact with the inner surface of each said tubular body to form a series of spaced apart laminated tubular bodies joined by intermediate sections of said hollow lining member.

Preferably the strips of material originate from a continuous supply from which they are cut immediately prior to formation of the tubular bodies. In other embodiments they are formed into tubular bodies prior to being cut and then subsequently moved into engagement with the hollow lining member.

Also preferably, the intermediate sections of the hollow lining member are gathered and sealed to form a series of interconnected individually sealed laminated tubular bodies. The individual sealed bodies may then be separated to form bodies sealed at neither, one, or both ends.

Preferably the hollow member is extruded at a speed slower than that which the strips of material are moved so that a longitudinal stretch is introduced into the extruded member as it is inflated and applied to each body.

The laminated bodies produced by this process may be filled at the same time, or very shortly after the hollow member is inflated, by means of a filling nozzle positioned through the extrusion die. In this way individually sealed and filled containers may be produced in one process. Such containers are pilfer-proof insofar as any attempt to access the contents is immediately apparent as a result of damage to the integrity of the continuous extruded lining member.

A preferred embodiment of the invention will now be described, by way of example only, with reference to the accompanying drawings in which:

FIG. 1a illustrates an apparatus for use in the method according to the invention;

FIG. 1a' is a cross-section view taken on line 1a'—1a' of FIG. 1a;

Figure 1C:
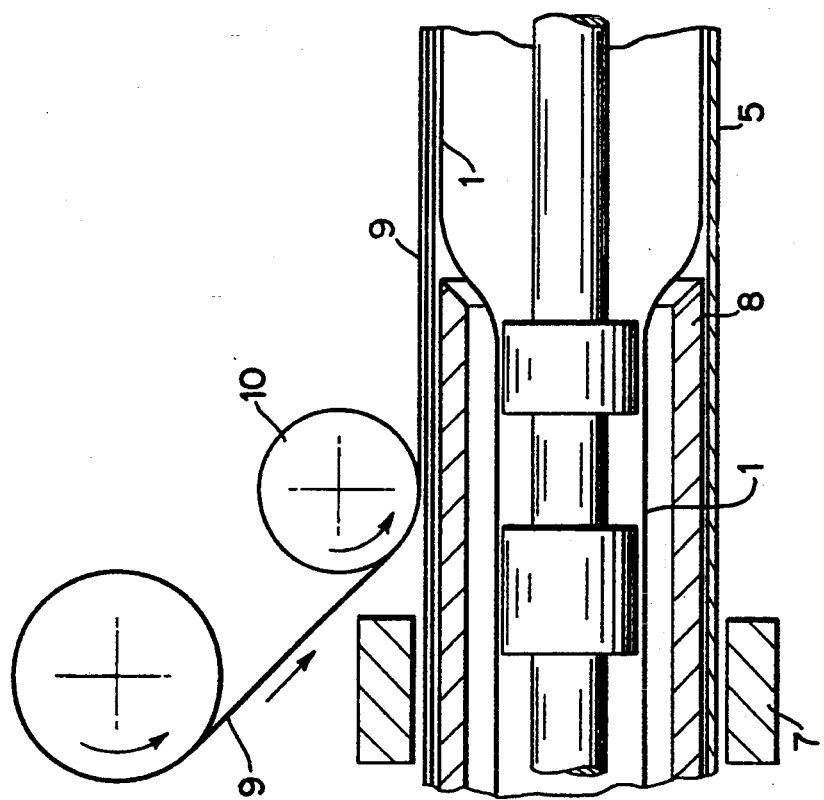
FIG. 1c illustrates a portion of the apparatus of FIG. 1a in more detail.
Figure 1B:
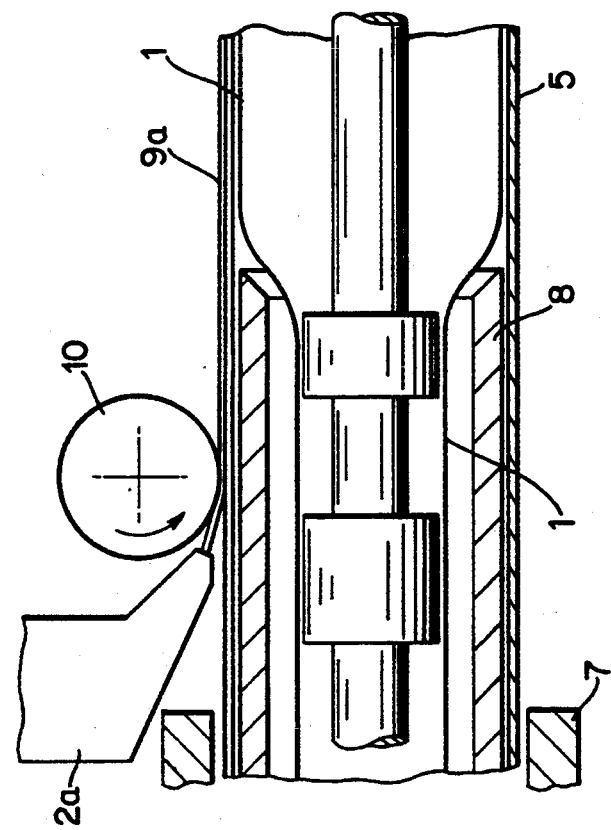
FIG. 1b illustrates a portion of a second form of apparatus.
Figure 1D:
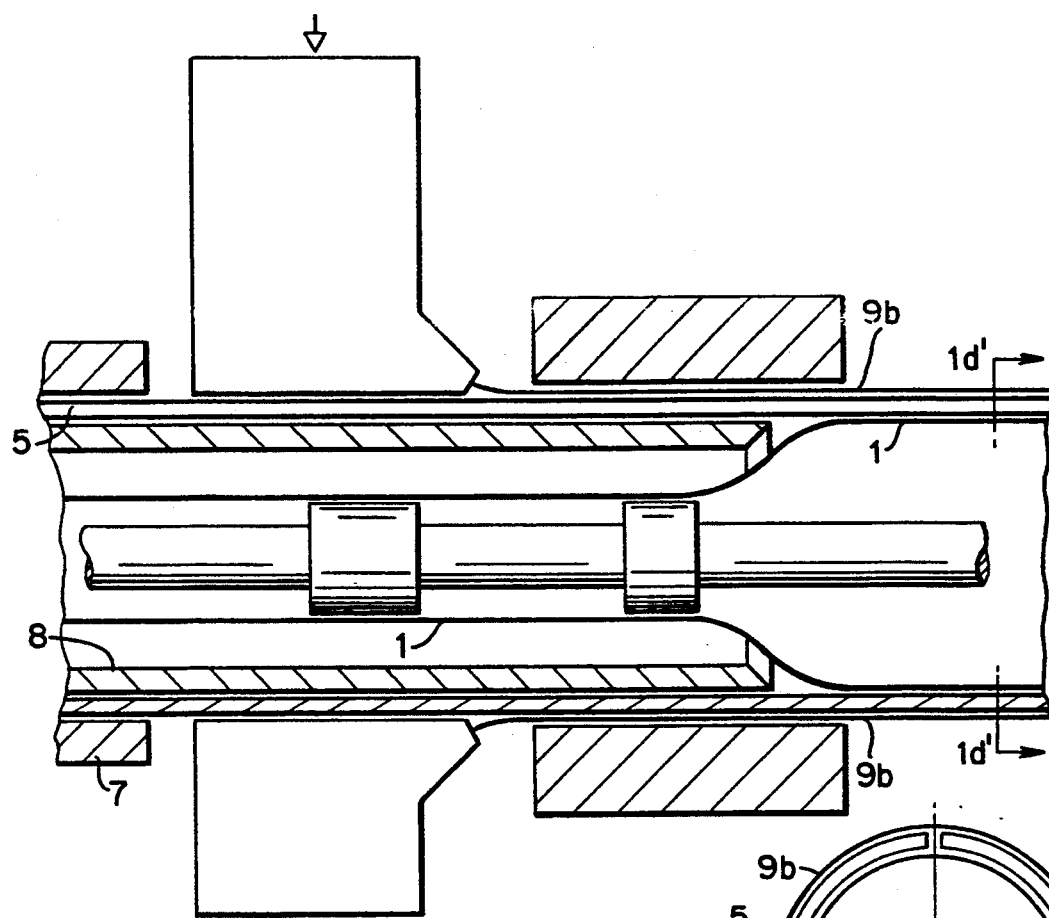
FIG. 1d illustrates a third embodiment.
Figure 1E:
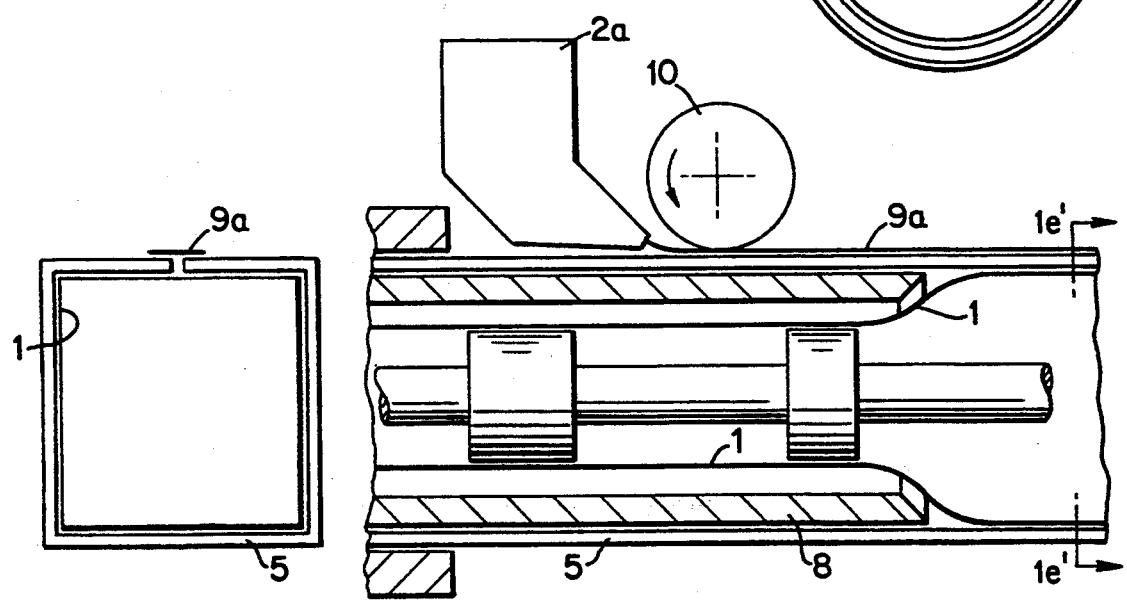
Figure 1F:
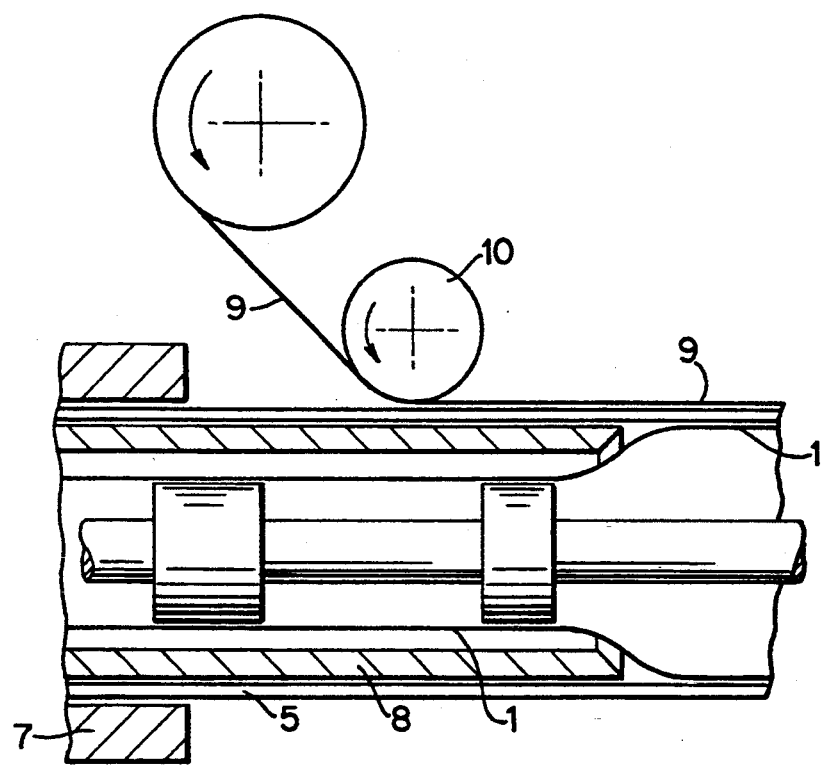
Figure 2:
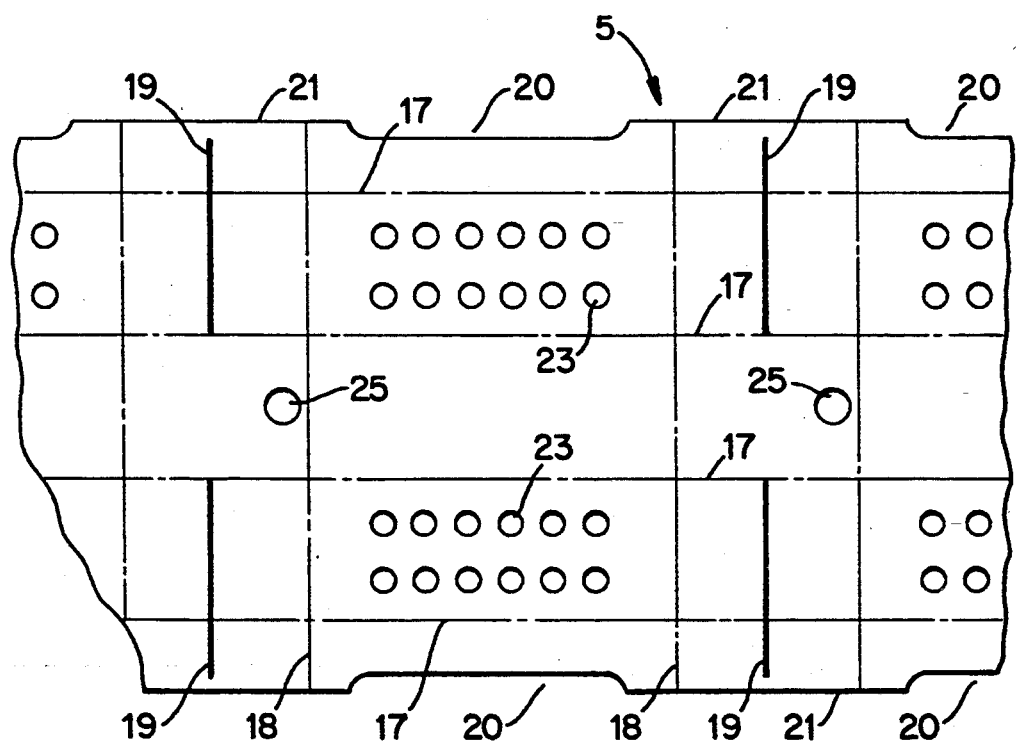
Figure 8:
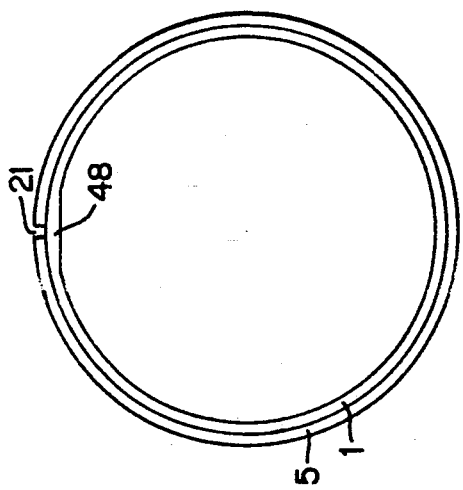
Figure 9:
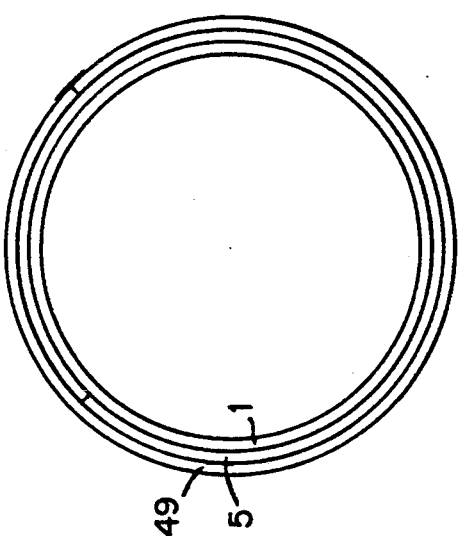
Figure 7:
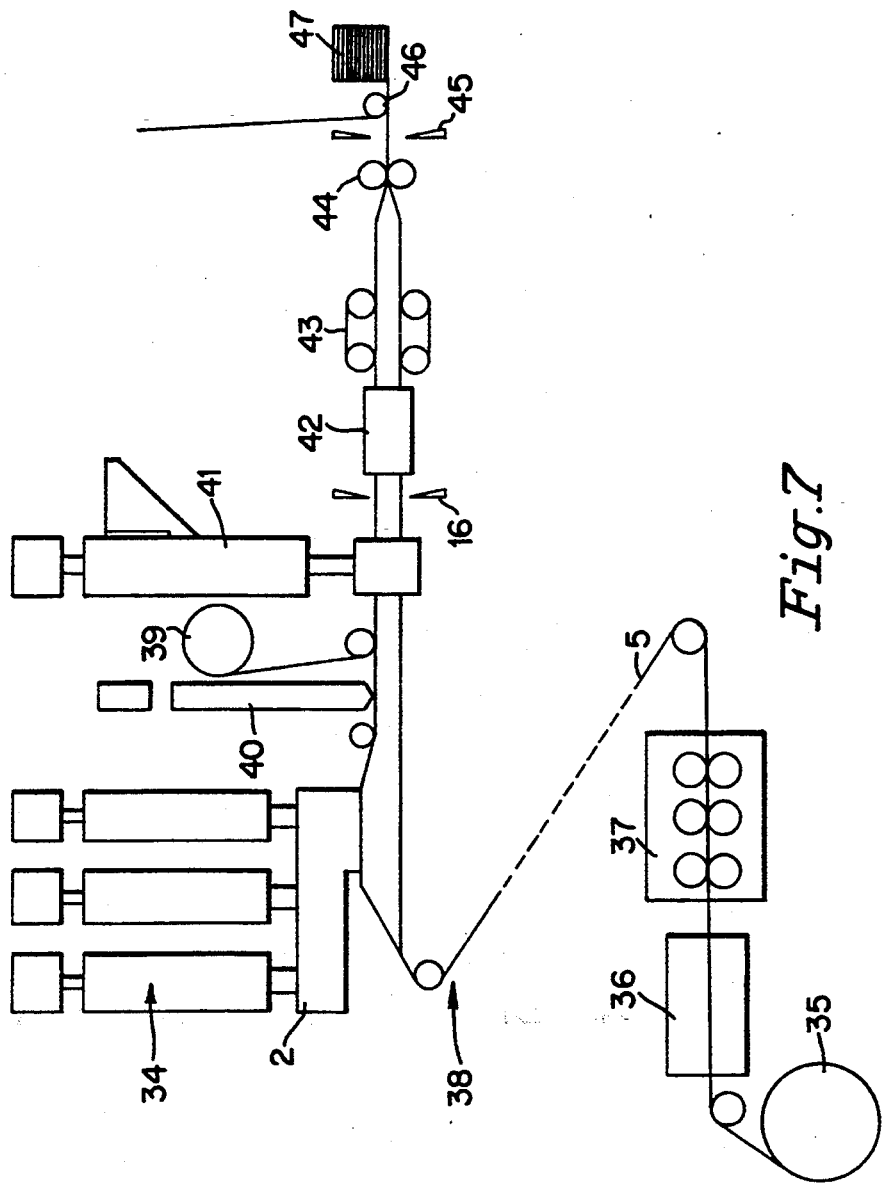
Figure 11:
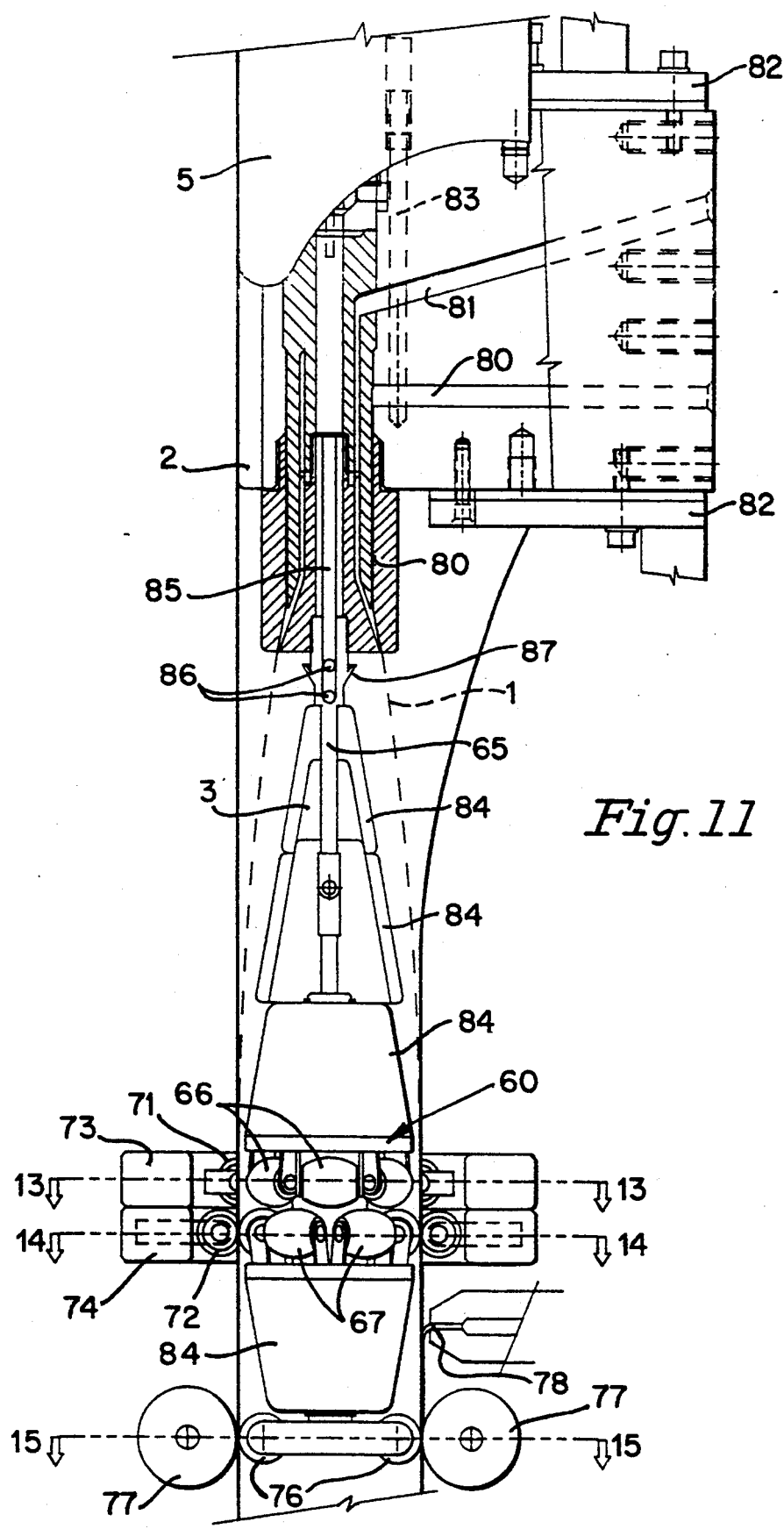
Figure 12:
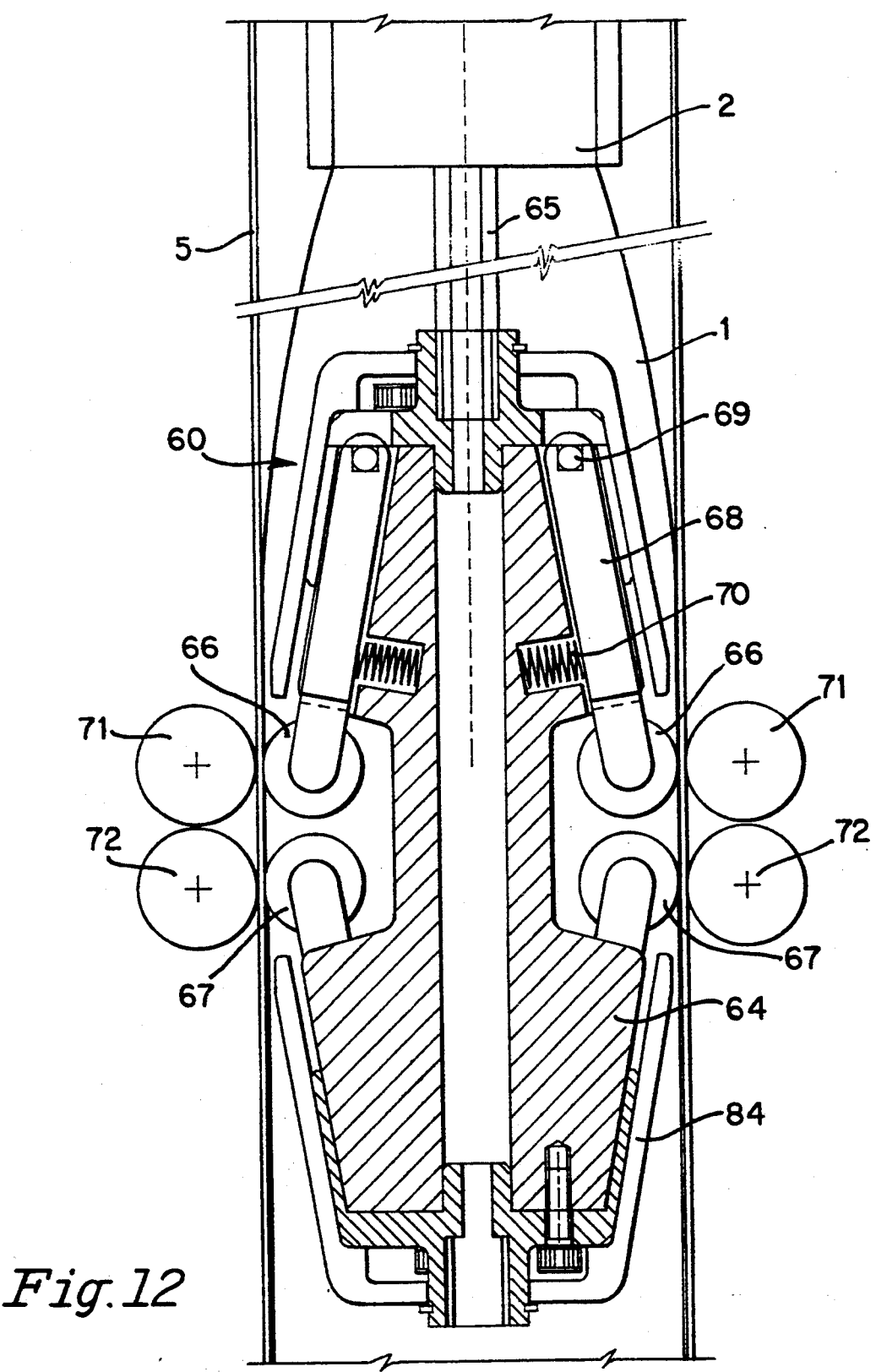
Figure 13:
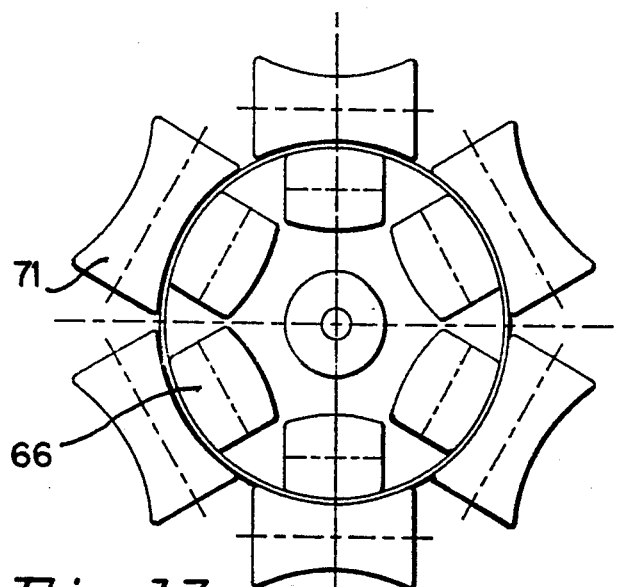
Figure 14:
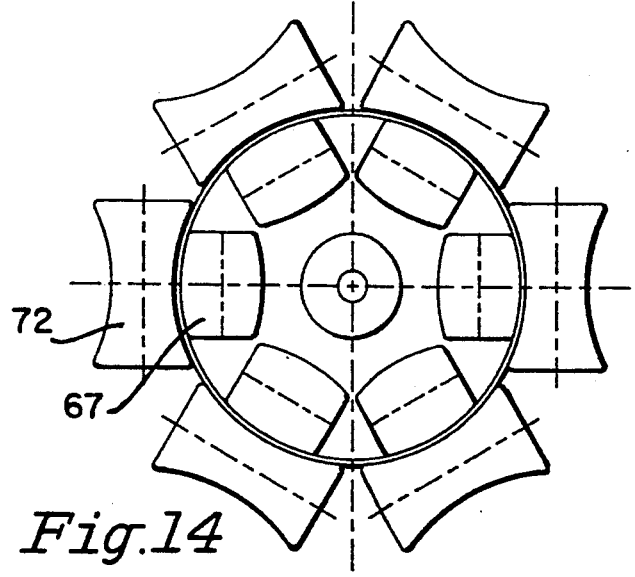
Figure 15:
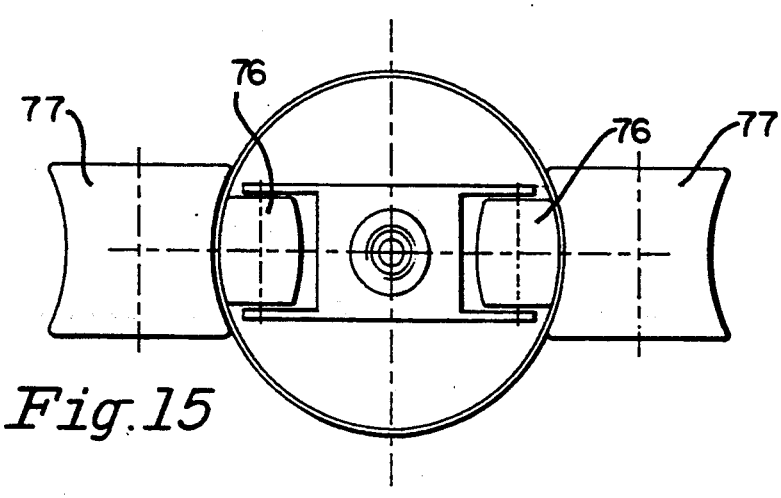
Figure 16:
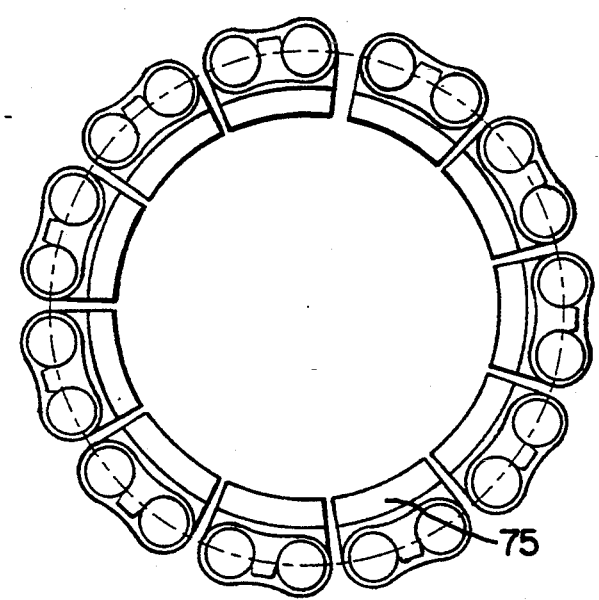

FIG. 1d' is a cross-section view of the laminated tubular body taken on line 1d'—1d' of FIG. 1d;

FIG. 1e illustrates a portion of a fourth embodiment of the invention;

FIG. 1e' is a cross-section view of the laminated square tubular body taken on line 1e'—1e' of FIG. 1e;

FIG. 1f illustrates a fifth embodiment;

FIG. 2 illustrates a strip of material for use in the method according to the invention;

FIG. 3 illustrates a sixth embodiment of the apparatus for use in the method according to the invention;

FIG. 3' is a cross-section detail view of the laminated square tubular body at location X in FIG. 3 to show the extruded spout;

FIGS. 4a and 4b illustrate a spout having a detachable plastics tab;

FIG. 5 illustrates a laminated tubular body formed in accordance with the method of the present invention;

FIGS. 6a and 6b illustrate a first spout arrangement incorporated into the laminated tubular body shown in FIG. 4;

FIGS. 6c and 6d illustrate an alternative spout arrangement;

FIG. 7 is a diagrammatic view showing an industrial plant for the mass production of laminated tubular bodies according to the invention;

FIG. 8 illustrates a first method of joining and sealing the longitudinal edges of the tubular body;

FIG. 9 illustrates an alternative form of longitudinal seam;

FIG. 10a illustrates an alternative form of apparatus for use in the method of the invention;

FIG. 10b illustrates some additional processing options which may follow the steps applied by the apparatus of FIG. 10aa;

FIGS. 10c and 10d illustrate a portion of an alternative apparatus to that shown in FIG. 10a;

FIG. 11 is a sectional side elevation showing an alternative embodiment of an apparatus for use in the manufacture of laminated tubular bodies according to the invention, embodying complementary internal and external pressure roller assemblies;

FIG. 12 is an enlarged sectional side elevation of the pressure roller assembly shown in FIG. 11;

FIG. 13 is a section taken on line 13—13 of FIG. 11;

FIG. 14 is a section taken on line 14—14 of FIG. 11;

FIG. 15 is a section taken on line 15—15 of FIG. 11;

FIG. 16 is a sectional view similar to FIGS. 13 and 14 showing an alternative embodiment wherein a series of circumferentially spaced friction pads replace the external pressure rollers.

Referring now to FIG. 1a, a hollow tube-like member 1 is extruded from die 2 and guided over internal mandrel 3 which is provided with cooling rings 4. A flat strip of base material 5 is drawn from a roll 6 and around the extruded member 1 by being passed through the gap between a forming ring 7 and an interior supporting mandrel 8. Die 2 could of course be repositioned at the forward end of mandrel 8 if required. The longitudinal edges of the strip of base material are brought into abutment by this process in order to completely surround the extruded member 1. A strip of adhesive tape 9 is drawn from a supply over roller 10 which presses it over the region on either side of the edges of material 5 which border the abutment. In this way the base material is made into a continuous sleeve surrounding the extruded tube-like member 1.

Nozzles 11 are provided on the third cooling ring of mandrel 3 to pump fluid, preferably air, into the interior of extruded member 1 in order to increase the pressure in area 14 relative to area 13 and inflate member 1. If desired the air may be sterilised, or alternatively another sterile or even inert gas may be used. A final disc 12 is mounted on the end of mandrel 3 some distance beyond the last cooling ring in order to maintain the inflating pressure. Disc 12 may be coated with teflon, or silicon rubber, and may have an adjustable outer diameter, possibly pneumatically controlled, to ensure the correct degree of radial stretching of member 1 is achieved.

Extruded member 1 is inflated until it contacts the inner side of the sleeve of material 5. A connection is provided between sleeve 5 and extruded member 1 by means of welding or gluing; alternatively the natural adhesive properties of material 1 may be utilised to bond the two layers together. Relatively low, or negative, pressure may be applied to area 14 to assist in the inflation of member 1, and to avoid bubbles forming between the layers. Transport rollers 15 react against disc 12 to press the layers together, and exert tension on the layers of the laminated structure to stretch extruded member 1 longitudinally as it is inflated. A cutting device 16 cuts the continuous laminated tube into lengths for further treatment, for instance for making into tubes or containers.

Of course, the connecting material 9 could comprise a bead or strip 9a of plastics material extruded from a nozzle 2a adjacent the seam, as shown in FIG. 1b.

Alternatively a sleeve 9b of plastics material could be extruded over the entire external area of the base material and then cooled to form a continuous outer envelope, as shown in FIG. 1d.

It should also be appreciated that the base material 5 may be formed into a body of any desired cross-section and need not be circular as shown, for instance it may be square as shown in FIGS. 1e and 1f, or oblong, or polygonal in cross-section.

Referring now to FIG. 2 a strip of base material 5 will be described from which a laminated tubular body of square cross-section embodying the first aspect of the present invention may be produced. The base material 5 is pre-creased longitudinally 17 and transversely 18, or otherwise weakened as necessary for further processing. The base material is also slit 19 at intervals to allow easy separation of the finished laminated tubular bodies; in this case base material 5 is paper. Regions of the paper may be treated with contact adhesive to assist in forming the final articles. Half slots 20 are cut out of the opposing edges 21, such that when the opposing edges are butted together a complete slot 22 appears down each body.

When the opposing edges 21 are butted together a transparent strip of connecting material is pressed along the join in order to connect edges 21 together and form a transparent panel covering slot 22. When the extruded member is subsequently inflated it expands and contacts the inner surfaces of the base material and transparent strip and adheres to them. In this way the seam along the base material is reinforced. The extruded member is made from a transparent material, or at least a material through which some light can pass, in order to provide an inspection window through slot 22. It is not necessary for the inspection window to be completely transparent provided any contents of the body can be perceived through it, for instance in cases where a dark coloured liquid is contained within the tubular body a window of light coloured fairly opaque material would suffice to enable the level of liquid to be discerned.

The inspection window need not, of course, be provided by means only of two half-slots 20 in the butting edges, and could equally well be provided by a complete slot cut into the body of base material 5, or a series of holes. The transparent panel need not serve to strengthen the seam in the formed tubular body, and other seam strengthening means could be employed if the strength of the bond between the inflated extruded member and the butted edges was not sufficient to hold the base material together.

The base material 5 is also penetrated by a pattern of small holes 23, and when the extruded member 1 is inflated it is pushed through holes 23 to form a series of projections 24 on the outer surface of the base material. Projections 24 are useful to provide grip on the outer surface of the final article and may be arranged in a pattern ergonomically designed to assist grip, such as hand-shaped. This is particularly useful for flimsy containers which are filled with heavy liquids, such as milk and fruit juice cartons. It should, of course, be appreciated that this feature is optional.

A slightly larger hole 25 is left in the base material 5 so that after it has been connected around the extruded member 1 and member 1 expanded, a spout 26 is formed by the expansion of the material of member 1 through hole 25 in the base material. A former or mould 27 for the spout is drawn alongside the base material, or alternatively is detachably attached at intervals in order to mould the shape of the spout. Relatively low, or negative, pressure may be applied to the distal end of former 27 in order to encourage the extruded material to adopt the shape of the nozzle. A tab 28 of plastics material as shown in FIGS. 4a and 4b may be provided in the mould before the spout is formed such that when the spout is formed it is welded to the plastics tab. The plastics tab 28 being welded to the spout along a line of weakness 29 which allows the tab to be manually detached in order to open the spout.

Once the extruded member has been inflated to its final shape the dimensions the tubular bodies may be separated by cutters 16 prior to further processing, such as folding, sealing top and bottom and filling, to produce a finished article.

FIG. 5 shows a finished article 30 embodying the first aspect of the present invention with an inspection window 22, gripping protuberances 24 and a spout 26. It should be appreciated that spout 26 is collapsible and may be pushed flat against the side of finished article 28 or even inverted into it. It should also be appreciated that the spout is not limited to the form shown, and may be any convenient shape or form. A flap 31 as shown in FIGS. 6a and 6b may be attached over spout 26. Flap 31 is of the kind which can be lifted at one end 32 to allow the contents of the article to be poured out through the spout, and resealed. The other end 33 being permanently secured to the article. FIGS. 6c and 6d show an alternative flap.

FIG. 7 illustrates a typical entire manufacturing plant for articles produced by the invented method. The parts of the plant corresponding to parts shown in previous figures has been allocated corresponding reference numerals. A source of raw materials 34 for the extruded member feeds to the extrusion die 2. Base material 5 originates from a roll 35 which passes through a splicer 36, slitting, cutting, creasing and punching operations 37 and a flame treatment 38 before being formed between forming the ring and mandrel. The base material may also be printed if required. Adhesive tape 9 originates on a roller 39, or alternatively a sealing bead is extruded from extruder 40. Further layers of laminate 5 may be applied, both internally and externally as desired, for instance an external sleeve may be extruded from extruder 41. The laminated bodies are cut into lengths for further processing by cutter 16. Each group of laminated bodies is cooled by cooling ring 42, and transported by caterpillar rollers 43 to be flattened, across diagonally opposite longitudinal edges, between rollers 44 before the tubular bodies are finally separated into individual articles by cutters 45. Application of flaps 29 occurs at stage 46 before the finished articles are stacked stacked 47. The individual articles may be taken from the stack formed and filled as required.

Although the aspects of the invention have been described with reference to specific examples it should be appreciated that many alternatives are possible within the scope of the invention. For instance despite the fact that it is preferred to bring the edges of the sleeve of base material 5 into abutment they may of course be overlapped if desired. A contact adhesive may be provided onto the surface of one of the edges of the material, in this case, in order to provide a secure bond along the seam.

A refinement which is preferred when the edges are brought into abutment is to selectively adjust the local thickness of the extruded inner member in order to make it thicker, and therefore stronger, in the region of the join 48, as shown in FIG. 8.

It is also envisaged that the invention could be used as part of a more complex process. For instance a process can be envisaged in which a first sleeve of base material 5 is secured by an inflated inner layer 1 as previously described, and then a second sleeve 49 of base material is drawn around the structure with its seam radially offset from the seam of the first strip of base material, that layer being secured, say, by a strip of tape or extruded bead, see FIG. 9.

It should also be appreciated that a hollow channel may be incorporated into die 2 and internal mandrel 3 in order to allow the tubular laminated body to be filled as the extruded inner layer is inflated. In this way the risk of contamination of the contents of the tubular bodies can be reduced.

Further, it should be appreciated that a flap 50 of base material as shown in FIGS. 6a and 6b may be associated with the spout aperture to co-operate with flap 31 to close spout 26.

Finally, it should be appreciated that although the invention has been described up to now with reference to a continuous process producing an endless laminated body, the layer of base material 5 could be intermittent leaving portions of the extruded inflated member 1 exposed, as indicated in FIGS. 10a and 10b. The exposed portions could subsequently be gathered and welded by means 51 to form a series of sealed individual containers 52, which could of course have been filled when the extruded members were inflated, or very soon after.

The intermittent supply of base material could originate from a continuous roll and be cut immediately prior to being formed around the extrusion die, for instance by cutters 53.

The individual sealed, and if desired filled, containers may be separated by means of cutters 54 cutting through the gathered weld in order to form individual containers sealed at both ends. Alternatively the containers could be separated in such a way as to be sealed at only one end (say by cutters 55), or to be open at both ends.

Containers which are filled and sealed at both ends have the advantage that the only remaining process step required is to cap the ends of the container with a cap of suitable base material. Even if not filled the sealed containers have the advantage of being crush-proof during further processing and transport as a result of the internal pressure of the inflating fluid.

When containers are being made with a cross-section which can be flattened along pre-formed longitudinal creases and it is not desired to fill the containers immediately, the sealing and parting of the inflated member 1 may be carried out as shown in FIG. 10c to produce a container body sealed at both ends, or, as shown in FIG. 10d to produce containers sealed at only one end. Individual containers produced in this way may of course enjoy any of the features previously described with reference to continuous bodies.

FIGS. 11 to 16 show an alternative embodiment employing complementary internal and external pressure rollers. The internal roller assembly 60 includes an axially disposed frame 64 supported from beneath the extrusion die 2 by a central mandrel 65. The internal assembly includes two axially spaced sets of circumferentially spaced convex pressure rollers 66 and 67. The upper set of rollers 66 is staggered with respect to the lower set 67 to provide substantially continuous circumferential contact with the inner surface of the inner lining member 1.

The internal rollers are each supported by lever arms 68 hinged at 69 and resiliently biased outwardly by springs 70 towards their respective upper and lower complementary staggered sets of external concave rollers 71 and 72. These external rollers are supported by ring assemblies 73 and 74 which can each hinge outwardly to provide access to the internal assembly 60.

It will be appreciated that the internal and external rollers are spaced circumferentially around the laminated body in resiliently opposed relationship. In this way, the outer tubular body and the inner lining member are positively urged into bonding engagement by direct mechanical pressure from the respective roller assemblies. The adhesive properties of the heated lining member or an additional adhesive layer prevent the lining from subsequently breaking away from the outer body.

The external rollers may be fixed, adjustable, or free floating as required to suit particular applications. FIG. 16 shows an alternative embodiment wherein the external sets of pressure rollers 71 and 72 are each replaced by a corresponding series of circumferentially disposed chain mounted friction pads 75. These pads interact with the correspondingly opposed internal rollers 66 and 67 to sandwich the laminates together, thereby ensuring adequate bonding in essentially the same manner as described above.

The FIG. 11 embodiment also includes a nozzle for extruding a plastics sealing strip 78 across the opposed butted edges of the outer tubular body 5. The internal roller assembly 60 supports an inner set of opposed internal and external forming rollers 76 and 77 for forming the sealing strip against the body.

This embodiment also includes a double path die assembly where an outer annular layer of adhesive is applied through passage 80 to surround a coaxial inner annular layer of barrier lining material applied through passage 81. The die 2 is heated by plate heaters 82 and cartridge heaters 83, which also supply initial internal heating to the closely adjacent outer tubular body 5, thereby assisting the bonding process.

A set of low friction plastics guards 84 protect the internal roller assembly and guide the expanding inner lining outwardly and towards the inner rollers.

Low pressure air is supplied to the interior of the inner lining by an axial passage 85 in the mandrel 65. The air exits through holes 86 and at least part is directed upwardly towards the die by conical deflector 87 to balloon the lining outwards.

In other embodiments, the die may be configured to extrude a number of coaxial annular layers to suit particular applications. For example, the product may require several different types of barrier material in addition to an adhesive layer. In other cases the adhesive properties of the barrier material may be sufficient for only a single inner lining, without the need for a separate adhesive layer.

It will be appreciated that by ensuring proper adhesive bonding and thereby preventing subsequent separation of the lining member in a substantially continuous process, the present invention represents a commercially significant improvement over the prior art.

Although the invention has been described with reference to specific examples, it will be appreciated by those skilled in the art that the invention can be embodied in many other forms.

I claim:

1. A method of continuously forming laminated tubular bodies, said method including the steps of drawing opposite longitudinal edges of a strip of flexible sheet material into close proximity, joining said longitudinal edges to form a tubular body having an inner surface and an outer surface, extruding a hollow plastics lining member within said tubular body, expanding the hollow lining member within the tubular body to form a substantially continuous inner lining, applying internal and external pressure, substantially simultaneously, to bring the inner lining into bonding engagement with the inner surface thereby continuously to form a laminated tube, using a series of internal pressure rollers spaced circumferentially around the inner surface of the tubular body to provide said internal pressure, and cutting the tube into bodies of preselected lengths.

2. A method according to claim 1 wherein said internal pressure rollers are adapted to introduce a longitudinal stretch into the lining member during the bonding step.

3. A method according to claim 1 wherein said external pressure is applied by external pressure roller means.

4. A method according to claim 3 wherein said external pressure roller means include at least one set of external rollers circumferentially spaced around the outer periphery of the tubular body.

5. A method according to claim 1 wherein said internal pressure is also provided by a fluid medium used to inflate the lining member.

6. A method according to claim 1 further including the step of resiliently urging said internal pressure rollers into engagement with the inner lining of the tubular body.

7. A method according to claim 1 including the step of forming at least one aperture in said tubular body prior to expanding said lining, such that the lining extends unjoined and unbroken through said at least one aperture to form a sealed protuberance projecting outwardly beyond the outer surface of the tubular body.

8. A method according to claim 7 including the step of forming an array of said sealed protuberances disposed to form a textured gripping surface.

9. A method according to claim 7 wherein said lining member is expanded within the tubular body by means of internal fluid pressure.

10. A method according to claim 9 wherein the hollow lining member is expanded so as to extend through said aperture to form a spout defining a channel in fluid communication with the interior of the laminated tube.

11. A method according to claim 1 wherein said hollow lining member is extruded continuously from a die, wherein the respective opposite longitudinal edges of a plurality of said strips are drawn into close proximity, wherein said respective opposite longitudinal edges are joined to form a plurality of tubular bodies, wherein said tubular bodies are arranged in spaced apart relationship around the hollow lining member, and wherein said lining member is expanded to form a substantially continuous lining in intimate contact with the inner surface of each said tubular body to form a series of spaced apart laminated tubular bodies joined by intermediate sections of said hollow lining member.

12. A method according to claim 11 including the further step of gathering and sealing said intermediate sections of said lining member to form a series of interconnected individually sealed laminated tubular bodies.

13. An apparatus for continuously forming a laminated tubular body, said apparatus including means for drawing opposite longitudinal edges of a strip of sheet material into close proximity, means for joining said longitudinal edges to form a tubular body having an inner surface and an outer surface, a die for extruding a hollow plastics lining member within said tubular body, means for expanding the hollow lining member within the tubular body to form a substantially continuous lining, pressure means located internally of said hollow lining member and pressure means located externally of said tubular body for simultaneously applying internal and external pressure, thereby pressing the inner lining into bonding sealed engagement with the inner surface of the outer tubular body, said internal pressure means including a set of internal pressure rollers spaced circumferentially around the inner periphery of the tubular body, and cutting means for cutting the continuously formed laminated tubular body into preselected lengths.

14. An apparatus according to claim 13 wherein said external pressure means include at least one set of external pressure rollers circumferentially spaced around the outer surface of the tubular body.

15. An apparatus according to claim 13 wherein the internal pressure means also comprises a fluid medium used to inflate the lining member.

16. An apparatus according to claim 13 further including spring bias means disposed resiliently to urge the internal pressure rollers outwardly into engagement with the inner lining member.

17. An apparatus according to claim 16 wherein said internal pressure roller means are disposed also to exert tension to stretch the lining longitudinally during bonding to the tubular body.

18. An apparatus according to claim 13 wherein the internal pressure means include at least two axially spaced sets of generally convex internal pressure rollers disposed circumferentially around the inner periphery of the tubular body with one set staggered with respect to the other, and wherein the external pressure means include at least two axially spaced sets of generally concave external pressure rollers disposed circumferentially around the outer periphery of the body with one set staggered with respect to the other, the internal pressure rollers respectively being resiliently biased outwardly towards their opposing complementary sets of external pressure rollers.

19. An apparatus according to claim 18 wherein each axially spaced set of external pressure rollers is located on a removable ring assembly.

20. An apparatus according to claim 18 wherein said internal pressure rollers are mounted on an internal roller assembly supported from an extrusion die.

21. An apparatus according to claim 20 including a nozzle for extruding a plastics sealing strip across opposed edges of the outer tubular body, said internal roller assembly supporting an inner set of opposed internal and external forming rollers adapted to form the sealing strip against the body.

22. An apparatus according to claim 20 wherein said internal roller assembly includes a plurality of low friction guards to protect the internal roller assembly and guide the expanding inner lining member outwardly towards the inner rollers.

23. An apparatus according to claim 20 including a passage through said die for supplying fluid under pressure to the interior of said lining member to expand the lining radially outwardly toward the surrounding tubular body.

24. An apparatus according to claim 13 wherein said extrusion die is configured to supply at least two generally coaxial annular layers of plastics material.

25. An apparatus according to claim 24 wherein said outer tubular body passes closely adjacent to said die thereby to receive heat from the die to assist in said bonding engagement.

26. Apparatus according to claim 13, further including means for forming at least one aperture in said tubular body prior to expanding said lining, such that upon expansion the lining extends unjoined and unbroken through said at least one aperture to form a sealed protuberance projecting outwardly beyond the outer surface of said tubular body.

27. A method of continuously forming laminated tubular bodies, said method including the steps of drawing opposite longitudinal edges of a strip of flexible sheet material into close proximity, joining said longitudinal edges to form a tubular body having an inner surface and an outer surface, extruding a hollow plastics lining member within said tubular body, expanding the hollow lining member within the tubular body to form a substantially continuous inner lining, applying internal and external pressure, substantially simultaneously, to bring the inner lining into bonding engagement with the inner surface of said tubular body thereby continuously to form a laminated tube, said external pressure being applied by external pressure roller means which include at least one set of external rollers circumferentially spaced around the outer periphery of the tubular body, said method including the step of resiliently urging said external rollers into engagement with the outer surface of said tubular body, and cutting the tube into bodies of preselected lengths.

28. A method of continuously forming laminated tubular bodies, said method including the steps of drawing opposite longitudinal edges of a strip of flexible sheet material into close proximity, joining said longitudinal edges to form a tubular body having an inner surface and an outer surface, extruding a hollow plastics lining member within said tubular body, expanding the hollow lining member within the tubular body to form a substantially continuous inner lining, applying internal and external pressure, substantially simultaneously, to bring the inner lining into bonding engagement with the inner surface of said tubular body, said external pressure being applied by external pressure roller means which include at least one set of external rollers circumferentially spaced around the outer periphery of the tubular body, said method providing that said external rollers define a generally concave contact surface adapted to conform to an outer surface profile of a corresponding portion of the tubular body, and cutting the tube into bodies of preselected lengths.

29. A method of continuously forming laminated tubular bodies, said method including the steps of drawing opposite longitudinal edges of a strip of flexible sheet material into close proximity, joining said longitudinal edges to form a tubular body having an inner surface and an outer surface, extruding a hollow plastics lining member within said tubular body, expanding the hollow lining member within the tubular body to form a substantially continuous inner lining, applying internal and external pressure, substantially simultaneously, to bring the inner lining into bonding engagement with the inner surface of said tubular body thereby continuously to form a laminated tube, using a series of internal pressure rollers spaced circumferentially around the inner surface of the tubular body to provide said internal pressure, using a series of circumferentially spaced-apart friction pads around said tubular body to apply said external pressure, and cutting the tube into bodies of preselected lengths.

30. An apparatus for continuously forming a laminated tubular body, said apparatus including means for drawing opposite longitudinal edges of a strip of sheet material into close proximity, means for joining said longitudinal edges to form a tubular body having an inner surface and an outer surface, a die for extruding a hollow plastics lining member within said tubular body, means for expanding the hollow lining member within the tubular body to form a substantially continuous lining, pressure means located internally of said hollow lining member and pressure means located externally of said tubular body for simultaneously applying internal and external pressure, thereby pressing the inner lining into bonding sealed engagement with the inner surface of the outer tubular body, said external pressure means include at least one set of external pressure rollers circumferentially spaced around the outer surface of the tubular body and said apparatus further includes spring bias means disposed resiliently to urge the external pressure rollers inwardly into engagement with the outer surface of the tubular body, and cutting means for cutting the continuously formed laminated tubular body into preselected lengths.

31. An apparatus according to claim 30 wherein each said external pressure roller defines a generally concave contact surface adapted to conform to an outer surface profile of a corresponding portion of the tubular body.

32. An apparatus for continuously forming a laminated tubular body, said apparatus including means for drawing opposite longitudinal edges of a strip of sheet material into close proximity, means for joining said longitudinal edges to form a tubular body having an inner surface and an outer surface, a die for extruding a hollow plastics lining member within said tubular body, means for expanding the hollow lining member within the tubular body to form a substantially continuous lining, pressure means located internally of said hollow lining member and pressure means located externally of said tubular body for simultaneously applying internal and external pressure, thereby pressing the inner lining into bonding sealed engagement with the inner surface of the outer tubular body, said external pressure means comprising a series of circumferentially spaced-apart friction pads, and cutting means for cutting the continuously formed laminated tubular body into preselected lengths.

* * * * *